United States Patent [19]

Kato et al.

[11] 3,874,778
[45] Apr. 1, 1975

[54] ROTARY MIRROR SCANNER

[75] Inventors: Shigeo Kato, Mitaka; Hitoshi Masuko, Sagamihara; Yukio Kameyama, Hino, all of Japan

[73] Assignees: Hitachi, Ltd.; Nippon Hoso Kyokai, both of Tokyo, Japan

[22] Filed: Dec. 26, 1973

[21] Appl. No.: 428,008

[30] Foreign Application Priority Data
Dec. 27, 1972 Japan.............................. 47-129795

[52] U.S. Cl........................... 350/7, 350/6, 350/285
[51] Int. Cl. ............................................ G02b 17/00
[58] Field of Search ............ 73/9, 15; 308/173, 174; 350/6, 7, 285, 255; 250/234–236; 178/7.6

[56] References Cited
UNITED STATES PATENTS
3,166,997    1/1965    Barcia et al....................... 350/255
3,511,149    5/1970    Blattner et al..................... 350/255

*Primary Examiner*—Ronald L. Wibert
*Assistant Examiner*—Michael J. Tokar
*Attorney, Agent, or Firm*—Craig & Antonelli

[57] ABSTRACT

A rotary mirror scanner for deflecting a light beam by means of a rotary mirror driven mechanically. The rotary mirror is mounted on a rotary shaft supported by dynamic air or gas journal bearings and a repulsion type magnetic thrust bearing housed in a casing. By this arrangement, the need to use a compressed air or gas source which is essential to rotary mirror scanners of the prior art is eliminated and the rotary mirror scanner can rotate very quietly at very high speeds.

4 Claims, 2 Drawing Figures

ROTARY MIRROR SCANNER

BACKGROUND OF THE INVENTION

This invention relates to a rotary mirror scanner comprising a mirror which is mechanically driven to rotate to thereby effect deflection of a light beam.

A rotary mirror scanner offers the advantage of providing a larger deflection angle than an electro-optic crystal. However, since the deflection rate (or frequency) may vary depending on the number of revolutions of the mirror, it is necessary that the mirror should be rotated at the highest number of revolutions possible or tens of thousands of revolutions per minute, for example, in order to obtain a high resolution.

Rotation of the mirror at such high speeds requires the use of bearings of little frictional dragging. It has hitherto been customary to use, with a conventional rotary mirror scanner, static air bearings which utilize the static pressure of air. More specifically, the rotary mirror is mounted on a rotary shaft on which journals, a thurst plate and a rotor of a motor are mounted. Compressed air is introduced through an air inlet and ejected into a space between the journal bearings and the thrust bearing, so that the rotary shaft is supported both radially and axially by the static pressure of compressed air. The rotor produces a torque by virtue of the revolving magnetic field of a stator of the motor and the rotary mirror rotates at a predetermined number of revolutions.

Some disadvantages are associated with a rotary mirror scanner of the static air bearing type although it rotates smoothly. First of all, a compressed air source must be provided for the bearings. A compressor may be used as a compressed air source, but it produces loud noises. Besides, the use of a compressor makes it necessary to move the compressor too when the rotary mirror scanner is moved elsewhere. This is a great disadvantage.

Secondly, the mirror surface of the rotary mirror tends to be soiled with lubricant incorporated in the compressed air supplied to the static air bearings, causing a reduction in the deflection factor of the mirror. It is impossible comletely to remove oil from the compressed air. If the mirror is once soiled with oil, it is almost impossible to restore the original deflection factor to the rotary mirror by cleaning.

Thirdly, the air vented from the bearings produces loud noises because of the fact that the number of revolutions of the rotary shaft is very high.

It will be evident that all the aforementioned disadvantages of prior art stems from the use of static air bearings requiring compressed air for supporting the rotary shaft adapted to rotate the rotary mirror.

SUMMARY OF THE INVENTION

This invention has as its object the provision of a rotary mirror scanner for deflecting a light beam which can be readily moved to any place as desired because the need to use a compressed air source for supporting the rotary shaft for a rotary mirror scanner of the prior art is eliminated, which is devoid of the fear of the mirror surface of the rotary mirror being soiled with oil incorporated in the compressed air escaping from the compressed air source, and which can operate very quietly without making any appreciable noise even when the rotary mirror is rotated at high speeds.

The aforementioned object of the invention is accomplished by using dynamic gas or air journal bearings (hereinafter referred to as dynamic journal bearings) as journal bearings for the rotary shaft supporting the rotary mirror which do not need a supply of compressed gas from a compressed air source and support the rotary shaft by the dynamic force of air by increasing the air pressure as the rotary shaft rotates.

When dynamic air journal bearings are used, the rotary shaft may remain in contact with the journal bearings at the time the rotation of the shaft is initiated because of low dynamic pressure of air. However, since there is a difference between the outer diameter of the rotary shaft and the inner diameter of the journal bearings, such contact is a line contact. Moreover, no load is applied to the journal bearings by the rotary shaft, so that the contact pressure applied by the rotary shaft to the journal bearings is low. As a result, the frictional resistance offered by the journal bearings to the rotary shaft is very low when the latter is brought into contact with the former. Thus, the problems often raised when the rotation of a rotary shaft is initiated are eliminated by using journal bearings of the dynamic air type. The force with which the dynamic air journal bearings support the rotary shaft increases in magnitude as the number of revolutions of the rotary shaft becomes higher.

Besides the journal bearings, a thrust bearing must be used for bearing the weight of the rotary shaft. There is available a dynamic air thrust bearing which dynamically increases air pressure as the rotary shaft rotates so as to support the rotary shaft by the increased air pressure. This type of thrust bearing has a disadvantage in that the bearing and the rotary shaft are juxtaposed against each other over a wide area and the weight of the rotary shaft brings them into contact with each other when the shaft is stationary, so that difficulty is experienced in initiating the rotation of the rotary shaft.

Another disadvantage of the dynamic air thrust bearing is the fact that the high axial spring stiffness of the dynamic air thrust bearing have deleterious effects on the journal bearings, making it impossible to drive the rotary shaft to rotate at high speeds. Thus, the dynamic air thrust bearing is not fit for use with a rotary mirror scanner.

Accordingly, a repulsion type magnetic thrust bearing is used in the present invention as a thrust bearing for the rotary shaft. The repulsion type magnetic thrust bearing does not require air or other lubricant and supports the rotary shaft by the force of magnetic repulsion which is exerted by permanent magnets. When stationary, the rotary shaft is spaced apart axially from the repulsion type magnetic thrust bearing so that no difficulty is experienced in initiating the rotation of the rotary shaft.

By using the repulsion type magnetic thrust bearing in combination with the dynamic air journal bearings, the present invention makes it possible to initiate the rotation of the rotary mirror scanner readily without any trouble and to rotate the rotary shaft at high speeds in a stable manner.

The rotary mirror scanner according to the invention can eliminate a compressed air source because no compressed air is needed for the repulsion type magnetic thrust bearing and dynamic air journal bearings. Thus, the disadvantages of the rotary mirror scanner of the prior art of being soiled with oil incorporated in compressed air and having its reflection factor being thereby reduced are obviated. Besides, since no compressed air is vented from the bearings, no noise accompanies the high speed rotation of the rotary shaft.

DESCRIPTION OF A PREFERRED EMBODIMENT

Figure 1:
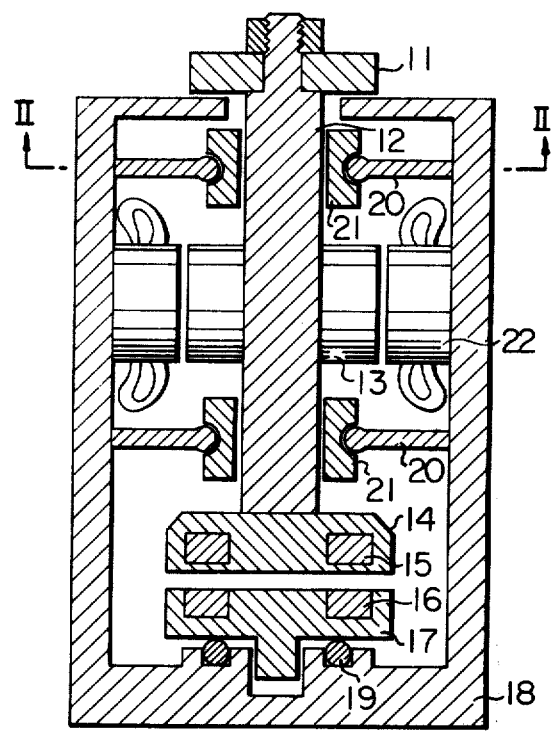
FIG. 1 is a vertical sectional view of the rotary mirror scanner for deflecting a light beam comprising one embodiment of the invention.

FIG. 1 is a vertical sectional view of the rotary mirror scanner for deflecting a light beam comprising one embodiment of the invention in which dynamic air journal bearings of the tilting pad type are used as one form of dynamic air journal bearings.

In the figure, a rotary shaft 12 supports at one end a rotary mirror 11 and is provided at the other end with a rotary magnet 15 serving as a repulsion type magnetic thrust bearing, the rotary magnet 15 being reinforced by a stiffner 14 made of an aluminum or titanium alloy and axially magnetized. The rotary shaft 12 is attached at its intermediate portion to a rotor 13 of an electric motor. Juxtaposed against the rotary magnet 15 and spaced apart therefrom are stationary magnet 16 which are magnetized oppositely to the rotary magnet 15, so that the rotary shaft 12 can be supported axially by the force of repulsion produced by the two sets of magnet. The rotary magnet 15 and stationary magnet 16 may be of any shape as desired provided that no change is produced in the magnetic flux between there by the rotation of the rotary magnet 15. They may be annular as shown or in the form of a disc.

A damper means 19 made of soft rubber or other like material and adapted to perform a spring action and a vibration absorbing action is interposed between a stationary magnet support 17 and an end wall of a casing 18. The presence of the damper means 19 is effective to produce a decrease in the amplitude of an axial vibration of the rotary shaft 12. In place of the damper 19 made of soft rubber or other like material, a damper of the dash-pot type may be employed which utilizes the viscosity of oil or other fluid medium.

A plurality of pivot arms 20 extending radially of the casing 18 are each affixed at one end to the wall of the casing and support at the other end a pad 21 of a dynamic journal bearing. As shown, there are three pivot arms 20 in each dynamic air journal bearing disposed on each side of the motor. It is to be understood, however, that the invention is not limited to three pivot arms for each dynamic air journal bearing and that any number of pivot arms may be used as desired. The pads 21 are equal in number to the pivot arms 20 or one pivot arm 20 supports one pad 21 for pivotal movement about the forward end of each pivot arm 20.

Figure 2:
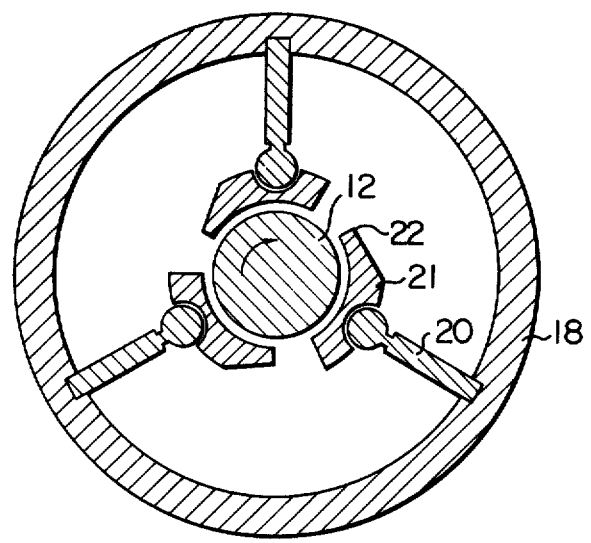
FIG. 2 is a transverse sectional view taken along the line II—II of FIG. 1.

Fig. 2 is a sectional view taken along the line II—II of FIG. 1 in which the rotary shaft 12 is shown as being radially supported by the pads 21 supported for pivotal movement by spherical bearing members of the pivot arms 20 affixed to the wall of the casing 18. Generally, the position of the spherical bearing member of each pivot arm 20 relative to the pad 21 is such that the ratio of the angle formed by one peripheral end of the pad 21 and the spherical bearing member with respect to the center of rotation of the rotary shaft 12 to the angle formed by the other peripheral end of the pad 21 and the spherical bearing member with respect to the center of rotation of the rotary shaft 12 is about 2 : 1.

Each pad 21 shown in FIG. 2 is in the form of one of four identical circularly arcuate portions produced by axially splitting a cylinder into identical four sections with a concave surface of the pad facing the rotary shaft 12. The inner radius of each pad 21 is larger than the outer radius of the rotary shaft 12 by 10 to 30 microns when the diameter of the latter 10 to 20 millimeters. It is to be understood that the invention is not limited to each pad 21 being in the form of a ¼ section of a cylinder and that the pad 21 may be produced by splitting a cylinder into any number as desired.

The rotary shaft 12 is rotated by the revolving magnetic field produced by a stator 22 of the motor at a predetermined number of revolutions or tens of thousands of revolutions per minute, for example. Since the rotary shaft 12 floats axially by virtue of the action of repulsion type magnetic thrust bearing, its rotation can readily be initiated by the motor. With an increase in the number of revolutions after its rotation is initiated, the rotary shaft is subjected to an intensive centripetal force exerted radially thereon by the dynamic air journal bearings, so that the rotary shaft 12 can continue its high speed rotation in a stable manner.

As shown, the rotary shaft 12 is supported in two positions by the dynamic air journal bearings. When dynamic air journal bearings are employed, it is customary to support the rotary shaft at least in two positions.

In the embodiment shown and described, the dynamic journal bearings of the tilting pad type are used. It is to be understood that the invention is not limited to this specific type of dynamic air journal bearings and that any type of dynamic air journal bearings, such as the herringbone type, floating bush type and the like, may be used instead.

From the foregoing description, it will be appreciated that the use of the dynamic air journal bearings in combination with the repulsion type magnetic thrust bearing for supporting the rotary shaft offers the advantages of eliminating the need to use a compressed gas source which a rotary mirror scanner for deflecting a light beam of the prior art needs and of permitting the rotary mirror scanner for deflecting a light beam according to the invention to operate very quietly without making any noise.

We claim:

1. A rotary mirror scanner comprising a rotary shaft having affixed to one portion thereof a rotary mirror comprising at least one mirror surface capable of deflecting in a predetermined direction a light beam incident thereon from one direction, a plurality of dynamic gas journal bearings each being disposed in a position for supporting said rotary shaft and adapted dynamically to increase the pressure of air surrounding the rotary shaft as the number of revolution of the rotary shaft increases so as to support the rotary shaft by radially exerting thereon a centripetal force, a repulsion type thrust bearing disposed in a position for axially supporting said rotary shaft and adapted to support the same by causing the same to float axially by the magnetic force of repulsion, and a drive disposed in the vicinity of said rotary shaft in a position other than the positions in which said rotary mirror, said dynamic gas journal bearings and said repulsion type magnetic thrust bearing are disposed so as to rotate the rotary shaft by the revolving magnetic field produced in the vicinity of the magnetic field.

2. A rotary mirror scanner according to claim 1 wherein said plurality of dynamic gas journal bearings are of the tilting pad type and comprises a plurality of pads each being in the form of a circularly arcuate shape and disposed in spaced juxtaposed relationship to the rotary shaft for supporting the same, and a plurality of pivot arms each supporting one of said pads for pivotal movement about a spherical bearing member formed in each pivot arm.

3. A rotary mirror scanner according to claim 1 wherein said repulsion type magnetic bearing comprises rotary magnet affixed to one portion of said rotary shaft and rotating therewith, and stationary magnet disposed in spaced juxtaposed relationship to said rotary magnet and magnetized oppositely thereto for causing the rotary shaft to float axially, said rotary magnet and said stationary magnet being of a shape such that no change is caused to occur in the magnetic flux between the rotary magnet and the stationary magnet by the rotation of the rotary magnet.

4. A rotary mirror scanner according to claim 3 further comprising a damper means adapted to hold said stationary magnet of said repulsion type thrust bearing and absorb the axial vibration of the rotary shaft.

* * * * *